United States Patent Office 2,795,455
Patented June 11, 1957

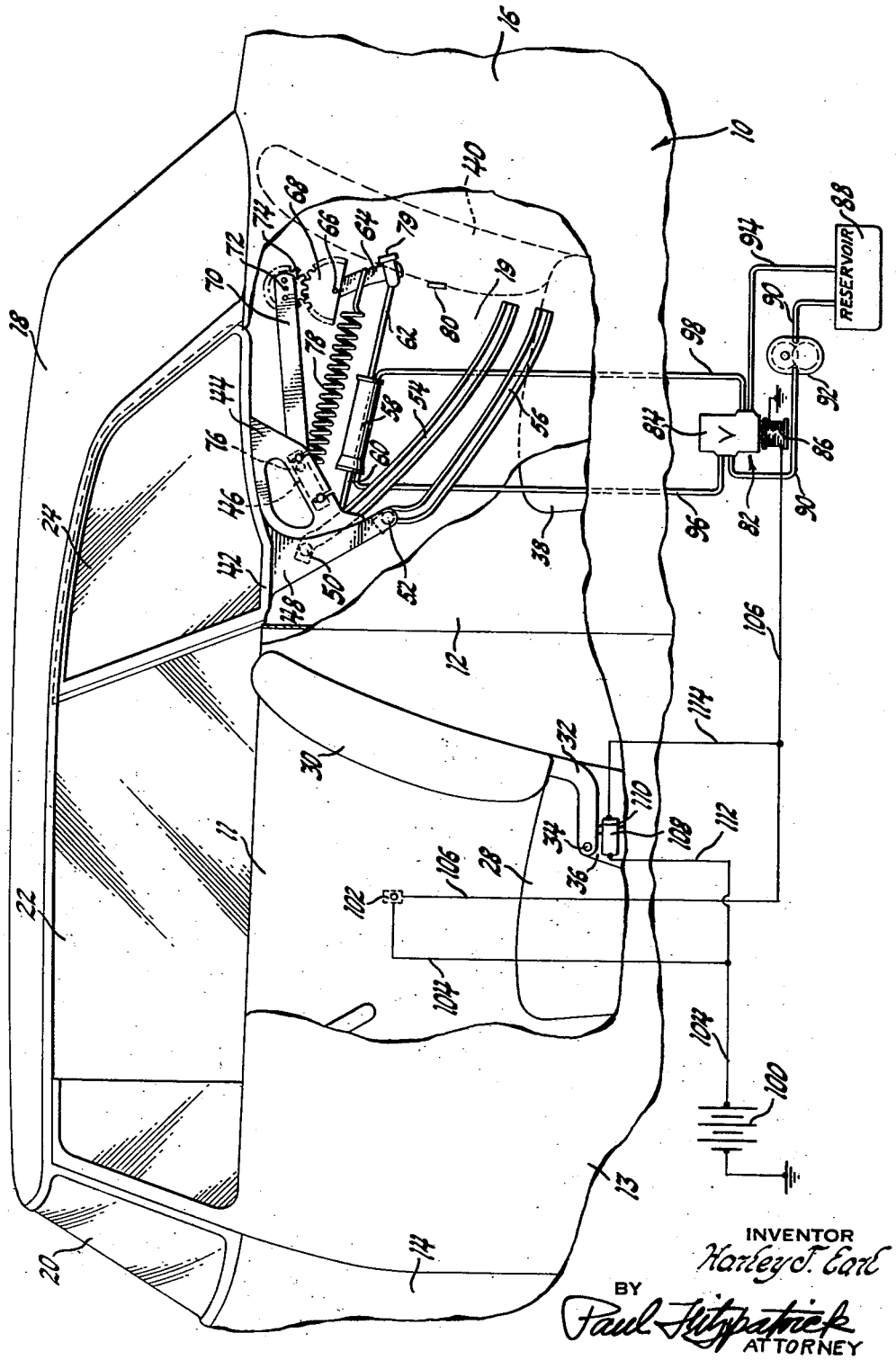

2,795,455

TILTABLE SEAT-BACK ACTUATED WINDOW OPERATING MEANS FOR TWO-DOOR VEHICLES

Harley J. Earl, Grosse Pointe Farms, Mich., assignor to General Motors Corporation, Detroit, Mich., a corporation of Delaware Application December 31, 1953, Serial No. 401,453

7 Claims. (Cl. 296—44)

This invention relates to window operating means, and more particularly to operating means for the rear quarter or side windows of an automobile.

One feature of the invention is that it provides improved window operating means; another feature of the invention is that it provides means whereby a window of an automobile may be automatically moved to retracted position to facilitate ingress to or egress from the passenger compartment of an automobile; a further feature of the invention is that means are provided for retracting the window in response to tilting movement of the front seat back to facilitate ingress to or egress from the rear passenger compartment of an automobile.

Other features and advantages of the invention will be apparent from the following description and from the drawing, in which the single figure is a fragmentary side elevation of an automobile incorporating the invention, portions of the automobile body being broken away to show underlying structure and the electrical and hydraulic apparatus being shown schematically.

The modern trend in automobile styling is to provide closely coupled bodies, but at the same time to provide a rear passenger compartment in the body with ample room to seat two or three passengers. In two-door automobiles ingress to and egress from the rear passenger compartment is facilitated by the provision of a front seat having a tiltable seat back. In the two-door automobile illustrated in the drawing, the rear quarter or side window which is adjacent the rear passenger compartment slopes forwardly and upwardly along its front edge so that a wide unobstructed side area of vision is provided for passengers in the rear passenger compartment, but the sloping front edge of the window partially obstructs the entrance way for passengers entering or leaving the rear passenger compartment of the automobile. The invention provides a novel means for facilitating ingress to and egress from the rear passenger compartment by lowering the rear quarter window whenever the back of the front seat is tilted forwardly.

Referring now more particularly to the drawing, 10 represents a two-door automobile body having front and rear passenger compartments 11 and 12, but having only front doors, as the door 13. The body includes a cowl portion 14, a rear quarter portion 16 and a top 18 which is of the convertible type. The door and body panels are of double wall construction as is conventional, a portion of the inner quarter panel being shown at 19. The front passenger compartment 11 is enclosed by a windshield 20 and a door window 22, and a rear quarter window 24 is provided in the body wall adjacent the rear passenger compartment 12.

Within the body is a front seat having a cushion portion 28 and a tiltable seat back 30 which is mounted on hinge arms 32 pivoted at 34 on the frame 36 which supports the seat cushion. A rear seat including a cushion 38 and a seat back 40 is mounted in the rear passenger compartment 12, and entrance to this rear passenger compartment is had through the front door 13, the front seat back 30 being tiltable forwardly to facilitate ingress to and egress from the rear passenger compartment.

The invention relates to a novel means for lowering the rear quarter window 24 as a function of or in response to tilting movement of the front seat back 30 to provide more room for passengers entering or leaving the rear passenger compartment. The rear quarter window 24 is mounted in a peripheral frame 42 from which extends a bracket 44 carrying a cam channel 46. Bracket 44 projects downwardly between the inner and outer rear quarter body panels 16 and 19 and is riveted to a horn-shaped roller bracket 48 which carries an upper roller 50 and a lower roller 52. An upper guide track 54 is mounted on the body wall and is engaged by the upper roller 50, and a lower guide track 56 is similarly mounted and is engaged by the lower roller 52, the rollers being movable along the respective tracks so that the window 24 may move from its illustrated extended or closed position downwardly and rearwardly to a retracted or open position.

Motor means for moving the window include a conventional hydraulic piston and cylinder device comprising a cylinder 58 mounted on the body between the inner and outer rear quarter panels on a support rod 60 and having therein a piston (not shown) connected to a piston rod 62. Rod 62 extends rearwardly from the cylinder 58 and is connected at its rear end to an arm 64 which is pivoted on the body panel 19 at 66 and which carries a gear sector 68, the sector 68 being rivted to or otherwise immovably secured to the arm 64. A second arm 70 is pivotally mounted on the body at 72 and has rigidly secured thereto a pinion 74 which meshes with gear sector 68. The forward end of arm 70 carries a roller 76 which engages the cam channel 46 on the support bracket 44.

Fluid pressure in the cylinder 58 projects the piston rod 62 rearwardly (to the right as illustrated) to the position shown and holds the window in its extended or closed position against the force of a spring 78 which is anchored at its front end to the body wall and which is connected at its rear end to the arm 64. When it is desired to lower the window 24, valve means described below are operated and the cylinder 58 is allowed to exhaust its fluid so that the window is lowered by the force of spring 78 which rotates arm 64 in a clockwise direction, causing counterclockwise rotation of arm 70 so that the window is pulled downwardly and rearwardly along guide tracks 54 and 56. In order to prevent jamming, roller 76 moves in cam channel 46. The window may be stopped and held at any intermediate position by closing the exhaust port and thereby blocking movement of the piston in the cylinder 58. When it is desired to move the window from open or retracted position to closed or extended position, fluid is admitted under pressure to the left or piston end of cylinder 58, forcing the piston rod 62 out of the cylinder and rotating arm 64 in a counterclockwise direction back to the position illustrated. This movement causes clockwise rotation of arm 70 so that the window is pulled up along guide tracks 54 and 56 to its extended position. In order to limit closing movement of the window, the lower end of arm 64 strikes a fixed stop 79, and in order to limit lowering movement of the window, the end of arm 70 adjacent roller 76 strikes a fixed stop 80.

A solenoid operated valve designated generally as 82 controls the fluid which is delivered to cylinder 58, this valve having a valve portion 84 and operating solenoids, one of which is shown at 86. 88 represents the oil reservoir for the hydraulic system and 90 is the feed line from the reservoir to the valve 84, a pump 92 being in this line to supply oil or other fluid under pressure to the valve. 94 is the exhaust line between the valve and the reservoir, and 96 and 98 are, respectively, the pressure and leakage drain connections between the valve 82 and the cylinder 58. The valve itself is of conventional construction and need not be described in detail.

The motor means including the hydraulic apparatus and spring 78 permit both opening and closing movements of the window; but inasmuch as the window closing structure is conventional and forms no part of the invention it is not illustrated to avoid unnecessary complication of the drawing. The apparatus for closing the window includes a second solenoid on the valve similar to solenoid 86, a window closing switch, and connections between the switch, the second solenoid and the pump 92. In order to move the window from open to closed position, the window switch would be closed, energizing the second solenoid and the pump 92 so that fluid under pressure is delivered to the cylinder 58. An internal mechanism in the valve is arranged to hold the valve port through which cylinder 58 exhaust closed unless solenoid 86 is energized so that the window can be stopped and held in any intermediate position. This mechanism is conventional in fluid operated automobile windows.

In order to control the operaton of the hydraulic motor means to lower the window, an electrical circuit is provided, including a battery 100, which may be a conventional automobile battery, and which is connected in a circuit including solenoid 86. For conventional manual operation of the window, one or more manually operated, normally open switches are provided, one of these switches being shown at 102 and being connected by a lead 104 to the battery 100 and by a lead 106 to the solenoid. Switch 102 conventionally is a double throw switch having spring means for holding the movable pole in neutral or open position. One side of the switch is connected to lead 106 as illustrated and the other side of the switch may be connected to the second solenoid above described and to pump 92 to provide for window closing operation as abve described. Switch 102 is shown as being mounted on the door panel so that the driver of the automobile can control the operation of the window 24. If desired, another similar double throw switch can be mounted in the rear passenger compartment, preferably adjacent window 24, so that the operation of this window can also be controlled from the rear passenger compartment. The usual arrangement is to provide a local control means adjacent each window of the automobile, and a master control located in the front passenger compartment within easy reach of the driver. In order to simplify the drawing, the local control in the rear passenger compartment of the automobile is not illustrated, but it could comprise a normally open double throw switch mounted on the inner rear quarter panel 19 and connected in parallel with switch 102.

In order to operate the rear quarter window 24 as a function of tilting movement of the front seat back 30, a normally closed spring-biased switch 108 is mounted on the front seat frame 36 so that the operating plunger 110 of the switch is engaged by the hinge arm 32 of the tilting seat back and the switch is held open by this hinge arm when the seat back is in its normal upright position as illustrated. Switch 108 is connected in parallel with switch 102 by means of leads 112 and 114, and when the switch is held open by the hinge arm 32 (and assuming switch 102 to be open), the solenoid 86 is deenergized so that window 24 is held closed against the force of spring 78. When the seat back is tilted forwardly to facilitate ingress to or egress from the rear passenger compartment, the hinge arm 32 swings away from the operating plunger 110 of switch 108, and the switch moves to its normal closed position under the force of an internal operating spring. This closes a circuit from the battery 100 to the solenoid 86, and the solenoid valve is operated to open a connection between lines 96 and 94 and exhaust cylinder 58 so that fluid pressure no longer holds the window 24 closed and it is moved to retracted position under the force of spring 78. After the passenger has entered or left the car, the seat back 30 is moved back to its normal upright position wherein hinge arm 32 engages plunger 110 to open switch 108, thereby breaking the circuit between the battery 100 and the solenoid 86. The window 24 may now be closed as above described by operation of either the master switch on the front door or the local switch on panel 19.

The tiltable seat back operating means in no way interferes with the normal operation of the window, and the window may be opened or closed at will by means of the manual switch 102.

While I have shown and described one embodiment of my invention, it is capable of many modifications. Changes, therefore, in the construction and arrangement may be made without departing from the spirit and scope of the invention as set forth in the appended claims.

I claim:

1. Apparatus of the character described, including: a vehicle body having a rear passenger compartment with a side wall having a single access opening and having a movable panel adjacent said opening which, in one position, partially obstructs the entranceway to said rear passenger compartment; a seat in said body adjacent said opening, said seat being movable to facilitate ingress to and egress from said compartment; and control means operatively connected to said panel and to said seat, said control means being operated by said seat upon movement thereof to move said panel to an out-of-the-way position upon movement of the seat.

2. Apparatus of the character described, including: a vehicle body having a rear passenger compartment with a side wall having a single access opening and having a movable window adjacent said opening which, when in closed position, partially obstructs the entranceway to said rear passenger compartment; a seat in said body adjacent said opening, said seat being movable to facilitate ingress to and egress from said compartment; motor means for moving said window; and control means operatively connected to said seat and to said motor means and being operated by said seat upon movement thereof to actuate said motor means and move said window into an out-of-the-way position upon movement of the seat.

3. Apparatus of the character described, including: a vehicle body having a rear passenger compartment with a side wall having a single opening with a door therein and having a movable window adjacent said opening, the forward side of said window, when in closed position, extending forwardly and upwardly and partially obstructing the entranceway to said rear passenger compartment; a seat in said body adjacent said opening, said seat being movable to facilitate ingress to and egress from said compartment; motor means for moving said window between open and closed positions; and control means operatively connected to said seat and to said motor means, said control means being operated by said seat upon movement thereof to actuate said motor means and move said window to open position upon movement of the seat.

4. Apparatus of the character described, including: a vehicle body having a rear passenger compartment with a side wall having a single access opening and having a movable window adjacent said opening, which, when in closed position, partially obstructs the entranceway to said rear passenger compartment; a seat in said body adjacent said opening, said seat being movable to facilitate ingress to and egress from said compartment; motor means for moving said window between open and closed positions; control means for said motor means including an electrical circuit; and a switch in said circuit located adjacent said seat and operated by said seat upon movement thereof to actuate said motor means and move said window to open position upon movement of said seat.

5. Apparatus of the character described, including: a vehicle body having a rear passenger compartment with a side wall having a single access opening and having a movable window adjacent said opening which, when in closed position, partially obstructs the entranceway to said rear passenger compartment; a seat in said body adjacent said opening, said seat having a seat back which is tiltable to facilitate ingress to and egress from said compartment; motor means for moving said window between open and closed positions including an electrical circuit; and a switch in said circuit located adjacent said seat back and operated by said seat back upon tilting movement thereof to actuate said motor means and move said window to retracted position.

6. Apparatus of the character described, including: an automobile body having a rear passenger compartment with a side wall having a single access opening and having a movable window adjacent said opening which, when in closed position, partially obstructs the entranceway to said rear passenger compartment; a seat in said body adjacent said opening, said seat having a seat back which is tiltable to facilitate ingress to and egress from said compartment; motor means for moving said window between open and closed positions, including a hydraulic piston and cylinder device and a solenoid controlled valve connected thereto; an electrical circuit connected to said solenoid and to a source of power; and a switch in said circuit for operating said solenoid, said switch being located adjacent said seat back and being operated by said seat back upon tilting movement thereof to energize the solenoid and cause actuation of the motor means to move the window to open position.

7. In an automobile having a body with a rear passenger compartment and a side wall having a single access opening and having a movable window adjacent said opening which, in one position, partially obstructs the entranceway to said rear passenger compartment, means for moving said window, including: a seat in said body adjacent the access opening, said seat being movable to facilitate ingress to and egress from said compartment; motor means connected to said window for moving the same; and control means operatively connected to said seat and to said motor means and being operated by said seat upon movement thereof to energize the motor means and move the window upon movement of the seat.

References Cited in the file of this patent

UNITED STATES PATENTS

| | | |
|---|---|---|
| 2,242,247 | Grant | May 20, 1941 |
| 2,499,749 | Hilliard et al. | Mar. 7, 1950 |
| 2,585,587 | Rappl | Feb. 12, 1952 |
| 2,621,037 | Riedel | Dec. 9, 1952 |
| 2,622,400 | Greer | Dec. 23, 1952 |
| 2,622,919 | Scott | Dec. 23, 1952 |
| 2,628,860 | Darrin | Feb. 17, 1953 |

FOREIGN PATENTS

| | | |
|---|---|---|
| 464,270 | Great Britain | Apr. 14, 1937 |